United States Patent
Düppre

(10) Patent No.: US 8,330,060 B2
(45) Date of Patent: Dec. 11, 2012

(54) WEIGHING STATION WITH ROTARY CONVEYOR ELEMENT

(75) Inventor: Theo Düppre, Kaiserlautern (DE)

(73) Assignee: Wipotec Wiege-und Positioniersysteme GmbH, Kaiserslautern (DE)

( * ) Notice: Subject to any disclaimer, the term of this patent is extended or adjusted under 35 U.S.C. 154(b) by 393 days.

(21) Appl. No.: 12/097,029

(22) PCT Filed: Dec. 12, 2006

(86) PCT No.: PCT/DE2006/002225
§ 371 (c)(1),
(2), (4) Date: Sep. 5, 2008

(87) PCT Pub. No.: WO2007/076794
PCT Pub. Date: Jul. 12, 2007

(65) Prior Publication Data
US 2009/0020340 A1    Jan. 22, 2009

(30) Foreign Application Priority Data
Dec. 15, 2005   (DE) .......................... 10 2005 060 039

(51) Int. Cl.
*G01G 17/00*   (2006.01)
(52) U.S. Cl. ........................................................ 177/145
(58) Field of Classification Search ............. 177/83, 177/145
See application file for complete search history.

(56) References Cited

U.S. PATENT DOCUMENTS

| | | | | |
|---|---|---|---|---|
| 2,775,727 A * | 12/1956 | Kernahan et al. | ............. | 318/601 |
| 4,122,940 A * | 10/1978 | Hoffmann | ........................ | 177/50 |
| 4,238,027 A * | 12/1980 | Oelte | ............................... | 177/50 |
| 4,531,597 A * | 7/1985 | Focke et al. | ...................... | 177/84 |
| 4,681,176 A * | 7/1987 | Moran et al. | ................... | 177/114 |
| 5,236,337 A * | 8/1993 | Kikuchi et al. | .................. | 177/52 |
| 5,852,259 A * | 12/1998 | Yanase | .......................... | 177/145 |
| 6,114,636 A * | 9/2000 | Cane' et al. | .................... | 177/145 |
| 6,162,998 A * | 12/2000 | Wurst et al. | .................... | 177/145 |
| 6,407,346 B1 * | 6/2002 | Baker | ............................. | 177/83 |
| 6,478,162 B1 * | 11/2002 | Yamamoto et al. | ........... | 209/593 |
| 6,887,611 B2 | 5/2005 | Cramer et al. | | |
| 7,154,055 B2 * | 12/2006 | Hebenstreit | ..................... | 177/83 |
| 8,178,798 B2 * | 5/2012 | Edrich et al. | ................... | 177/145 |
| 2006/0076165 A1 * | 4/2006 | Winkelmolen et al. | ....... | 177/145 |

FOREIGN PATENT DOCUMENTS

| | | |
|---|---|---|
| DE | 44 19 488 A1 | 12/1995 |
| EP | 0 501 208 A1 | 9/1992 |
| EP | 0823619 B1 | 4/2003 |
| FR | 2 147 983 A | 3/1973 |
| FR | 2 410 262 A1 | 6/1979 |
| JP | 58-079231 U | 5/1983 |
| JP | 03-282221 A | 12/1991 |

OTHER PUBLICATIONS

"Weighing Station Having a Conveyor Element" (Translation of WO 2007/076794), Dec. 2011.*

(Continued)

*Primary Examiner* — Randy W Gibson
(74) *Attorney, Agent, or Firm* — The Culbertson Group, P.C.

(57) ABSTRACT

A weighing station for weighing and sorting objects to be weighed, comprising a rotating conveyor element for transporting the objects further in that, in a conveying step, said conveyor element can rotate by a specifiable angle of rotation about its axis.

17 Claims, 1 Drawing Sheet

OTHER PUBLICATIONS

JPO, Notification of Reason for Refusal issued Dec. 20, 2010 in corresponding Japanese Patent Application No. 2008-544753 (6 pages) (English translation).

PCT, Written Opinion of the International Search Authority issued Jul. 8, 2008 in PCT International application No. PCT/DE2006/002225 (6 pages) (English translation).

* cited by examiner

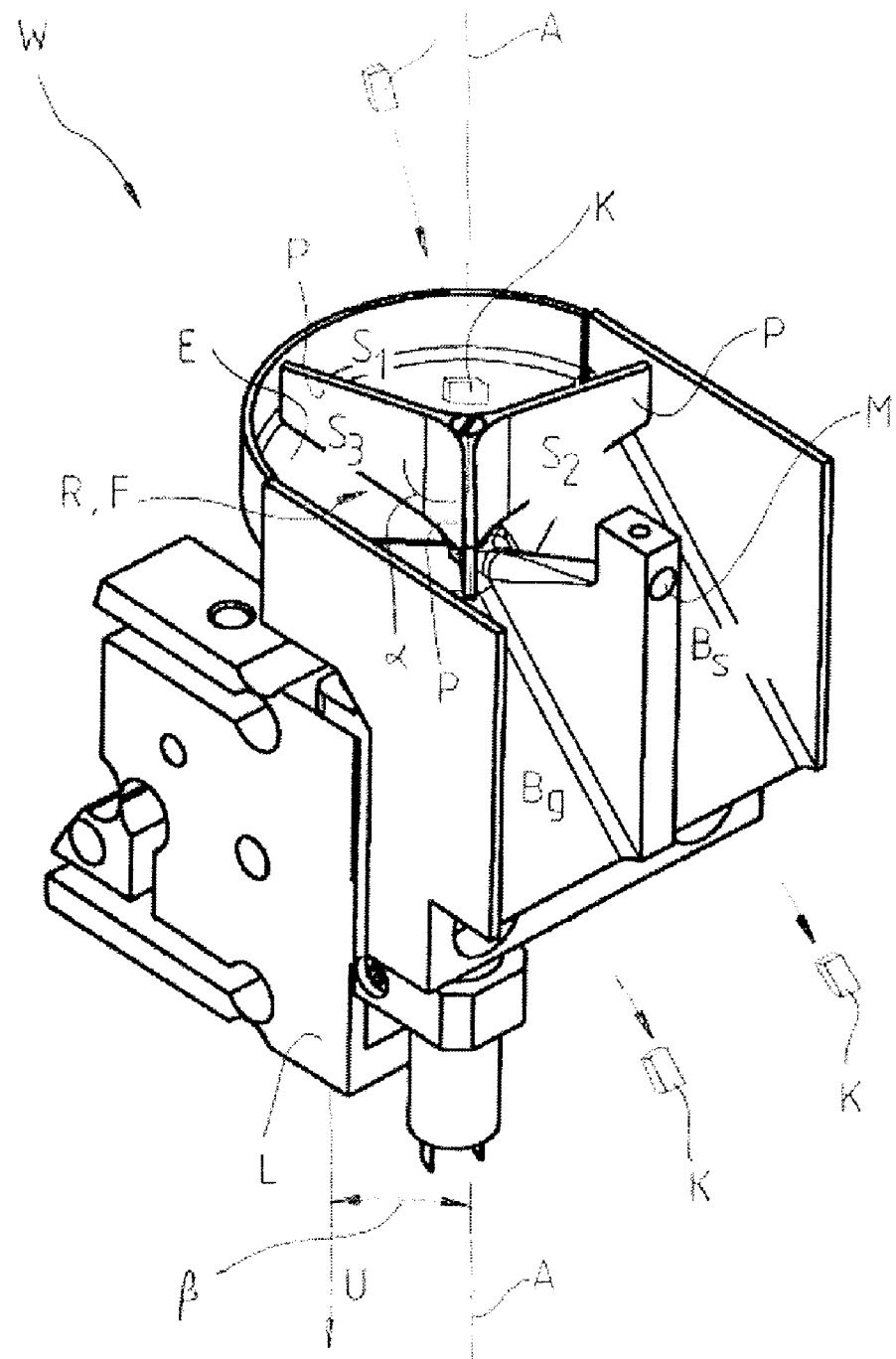

WEIGHING STATION WITH ROTARY CONVEYOR ELEMENT

FIELD OF THE INVENTION

The subject matter of the present invention relates to a weighing station for weighing and sorting objects to be weighed, which objects are to be transported further after or during the weight measuring procedure.

BACKGROUND

It is known from weighing technology that the weight of the products or objects manufactured in production processes must be ascertained, i.e., that the products must be weighed. In this context, the weighing procedure used should take the shortest time possible, on the one hand, yet the requirements with respect to the accuracy of the weighing result are very high, on the other hand. Especially in the production of tablets and/or capsules, the manufacture takes place at very high throughput rates, with the requirements with respect to the accuracy of the weight of each individual tablet and/or capsule (in general: "object") at the same time being very high.

DE 198 19 395 C1 discloses an apparatus for weighing hard gelatin capsules in which each separate capsule is transported into and discharged from a weighing area by means of a transport pawl and a blade-type wheel. The degree of design complexity of such an apparatus is very high, and the device is designed especially for specific capsule shapes.

Another apparatus for weighing hard gelatin capsules is known from DE 44 19 488 A1, in which a transfer mechanism is used to transport the products to be weighed into a weighing area where they are dropped onto the weighed support base. A swivel element separates the objects from the transfer mechanism. Again, the design complexity is relatively high, and the means of guiding and/or transporting the capsules are highly dependent on the shape of the capsules.

DE 697 20 886 T1 describes an apparatus for measuring the weight of capsules which comprises, among other things, a sliding transfer mechanism, a weighing mechanism and a discharge mechanism and therefore which also has a complex design and is dependent on the shape of the capsules.

U.S. Pat. No. 6,887,611 discloses a transport mechanism for capsules which are fed to and discharged from a weighing apparatus. Again, the capsules determine the complex design of the apparatus and the strictly format-dependent construction of the apparatus.

JP 3-282221 discloses a weighing mechanism with horizontally disposed conveyor drums for the gravity-determined sorting of weighed products.

EP 0 501 208 B1 describes a weighing apparatus in which a feeding mechanism targetedly feeds the products to be weighed to a weighing position and from there subsequently discharges them.

All apparatuses mentioned above have a high design complexity and do not weigh the individual objects rapidly enough.

SUMMARY OF THE INVENTION

The present invention provides a weighing station, by means of which the objects to be weighed are rapidly weighed and transported further, which weighing station can be used regardless of the format of the objects to be weighed and which, moreover, has a simple design.

According to the present invention, a weighing station should preferably comprise a conveyor element which is used to transport a weighed object further. This conveyor element can be rotated about an axis and has a number of segmented areas around the axis so that during the weighing procedure, the object to be weighed comes to rest on a support element in such a segmented area. The support element which rests on a load receptor transfers the gravity force of the thus supported object to be weighed into the load receptor. The load receptor picks up the gravity forces in the load transfer direction, which normally runs in a vertical direction.

According to the present invention, the conveyor element for transporting an object further after or during the weighing procedure is designed so that, in a conveying step, it can be rotated by a specifiable angle of rotation a about its axis. To this end, the object is enclosed by the segmented area of the conveyor element in such a manner that said conveyor element, by rotating about its axis, moves the object forward.

According to the present invention, the axis of the conveyor element is disposed at an angle $\beta < 90°$ with respect to the load transfer direction. This offers the advantage that conveying forces, which act on said angle element as the object is transported further, act only partially or not at all in the load transfer direction. As a result, the load receptor is subjected to lower or no interference factors which can develop as a result of the transport of the object away from the support surface since at least one portion of this conveying force acts perpendicular with respect to the load transfer direction and therefore does not act upon the load receptor.

In addition, the conveyor element is designed so that while transporting the object further, said conveyor element can transport the object optionally into at least two different discharge areas, i.e., it is able to sort the objects. A first area can be set aside for receiving objects that meet a specific weighing criterion, while another area can be set aside for objects which do not meet this criterion. The advantage is that in this manner, as each weighed object is transported further, the objects are sorted or sorted out, with the objective that the conveyor element feeds the objects to one or the other discharge area in accordance with specifiable criteria. In both cases, the transport is implemented by means of a rotation of the conveyor element about its axis. Thus, this type of compact weighing station has the advantage that it combines the functions of weighing and sorting out within a relatively small space, without requiring that the latter step be carried out in a downstream procedure. Only the objects that meet certain weight criteria leave the weighing station and move into the first discharge area, while the other objects are sorted out while still within the weighing station. This further simplifies and accelerates the production process.

This type of design makes it possible to weigh largely randomly shaped objects simply, accurately and rapidly and subsequently or simultaneously to transport them further by means of a rotation of the conveyor element. In addition, the weighed object is transported by the conveyor element only partially or not at all into the load transfer direction so that lower or no interference factors in this direction result from said transport.

If angle $\beta = 0$, the axis and the load transfer direction run parallel to each other. In this case, the transport is caused exclusively by forces that run perpendicular to the load transfer direction and thus do not at all act upon the load receptor. This ensures that the measurement result is optimally protected against such interference effects.

Another useful embodiment of the present invention provides that during the transport, one segmented area at a time sweeps over the area of the support element in which the object to be weighed is located. Thus, the conveyor element moves relative to the support element, and while sweeping over the above-described area, moves the object located therein away from the support area. The conveyor element can be designed so that it sweeps over the support area without making contact with said area. This is especially useful when the conveyor element is a component separate from the support element and is not weighed by or does not rest on the load receptor. In this case, it should not generate any forces in the load transfer direction. Otherwise (if the support element and the conveyor element are jointly supported by the load receptor), trailing brushes or the like might be used, in which case said brushes can come into contact with the support element.

An especially useful embodiment of the present invention provides that the segmented areas of the conveyor element be disposed around its axis in such a manner that after a completed transport step, another, preferably a neighboring, segmented area is available to transport the next object further. This means that as a result of the rotation of the conveyor element, the sector in which the currently weighed object is disposed is swiveled by the angle of rotation a about the axis so that now a different segmented area receives the next object to be weighed. The advantage is that the transport can take place quasi-continuously, without requiring the conveyor element to perform a forward and a backward movement when transporting each individual object. Simply by rotating the conveyor element by the angle $\alpha$, the object enclosed by said conveyor element is transported further, on the one hand, and at the same time, a new segmented area is made available, on the other hand, without requiring an additional separate movement. This speeds up the weighing and transporting process considerably.

According to an especially useful embodiment, the segmented areas are uniformly disposed about the axis, and the angle of rotation $\alpha$ is defined by the number n of all segmented areas according to the formula designated by equation 1:

$$\alpha = 360°/n \quad (1)$$

In this case, the angle of rotation corresponds to the angle that is defined by each segmented area relative to the axis of the conveyor element. It also follows that after the completed transport of an object, an immediately neighboring segmented area is available for receiving the next object to be weighed. The advantage is that this reduces the required angle of rotation a to a minimum and thus saves time.

In the simplest case, there are only two segmented areas which are axially symmetrical to each other. By rotating the conveyor element by 180°, the respective other segmented area is made available for receiving the next object. In accordance with the formula above, the increase in the number of the segmented areas reduces the angle of rotation a so that in particular three, four, five, six or more segmented areas symmetrical with respect to axis A and uniformly distributed in the circumferential direction can be provided. The larger the number of segmented areas, the smaller is the angle of rotation $\alpha$ and thus the time expenditure necessary for the entire conveyor element to transport a weighed object further.

According to an especially simple embodiment of the weighing station, the objects are transported into different discharge areas in that the rotation of the conveyor element into a first direction transports the object into a first discharge area, while the rotation of the conveyor element in the opposite direction transports the object into another discharge area. Thus, it is possible, simply by defining the direction of rotation, to transport the objects into at least two different discharge areas. Thus, using simple design measures, it is possible to sort the objects especially reliably and rapidly.

Yet another useful embodiment of the present invention provides that in cases in which the conveyor element is disposed separately from the load receptor, the axis of said conveyor element be oriented essentially in the direction of or parallel to the direction of the load transfer. Such a "vertical" configuration of the conveyor element and its axis reduces or avoids influences on the load receptor, which influences can develop as a result of the rotation of the conveyor element. Such influences, for one, are the already described conveying forces by means of which the conveyor element acts upon the object and which, in this case and to considerable advantage, act only perpendicular to the load transfer direction. Other forces acting radially with respect to this axis also cannot influence the measurement result. For example, an unbalance on the conveyor element cannot act in the load transfer direction. This ensures an especially reliable measurement result.

As an alternative to the design in which the support element and the conveyor element are separate components with a substantially vertical axis or an axis parallel to the load transfer direction, one embodiment of the present invention provides that the support element be integrally formed in one piece with the conveyor element and that, at the same time, it be disposed about a vertical axis. According to one of the simplest designs, the support element can have the shape of a disk which is divided into a plurality of segmented areas by vertical partitions similar to a sliced cake. These segmented areas define chambers which in the radial direction are outwardly open. After the weighing step, an object resting on the disk or in the chamber can be transported further and at the same time can be sorted by rotating the disk by the angle $\alpha$ about the axis, which causes the object resting on said disk or in said chamber to be propelled by the centrifugal force in the outward direction and thus to be ejected from the support element and the conveyor element. Depending on the direction of rotation and/or the rotational speed, the object can be fed into and can be received by the different discharge areas.

To summarize the potential configurations of the conveyor element, it is possible for the conveyor element to be designed separately from the support element or it can be formed in one piece with the support element. In addition, it can be supported in conjunction with the support element by the load receptor or it can be "uncoupled" from the load receptor by means of a separate mount which is not included in the weight measurement. The construction is simplified if both components rest on the load receptor. However, in this case, the additional weight of the conveyor element and its driving mechanism must be factored into the weight measurement process. The advantage in both cases is that the object to be weighed need not be "handled separately." Thus, to weigh the object, it is not necessary to uncouple it in a separate step from the conveyor element since a coupling is avoided or becomes unnecessary from the very beginning. The conveyor element either rests already on the load receptor (in which case uncoupling is unnecessary) or the object from the very beginning rests only on the support element (and the conveyor element acts upon the object solely to transport it further and ideally without forces in the load transfer direction).

The fact that the conveyor element and the support element are separately or jointly borne by the load receptor makes mounting and removing the separate or common components simple and makes cleaning the entire apparatus easy.

In another preferred embodiment of the present invention, the support element substantially has the shape of a downwardly tapering funnel segment so as to allow the object to be weighed to rapidly assume a position of rest. The object to be weighed that is introduced into such a funnel very rapidly reaches the lowest part of the funnel, where it rapidly comes to rest because of the limited space available. The advantage is that the transient vibration during the weight measurement step is shortened and thus overall contributes to speeding up the manufacturing process.

In the embodiment just mentioned, the angle of aperture of the funnel segment substantially corresponds to the angle which is defined by a segmented area and the axis. This means that each segment in combination with the wall of the funnel defines a receiving area in which the object to be weighed is securely held. By rotating the conveyor element by the angle α, the segmented area is swiveled away from the support element so that a new segmented area in combination with the wall of the funnel segment forms the next receiving area for the next object. According to the present invention, depending on the direction of rotation, the object of the previous segmented area is transported into a specifiable discharge area. This configuration of the conveyor element and the funnel segment, with an optimum utilization of material and small installation space, ensures that the weight can be measured rapidly.

According to another embodiment of the present invention, it is useful for the conveyor element to have the form of a paddle wheel, a blade-type wheel, etc., which has blades with segmented areas disposed in between said blades. In this case, as the blade-type wheel is transported further or rotates, one of the blades acts laterally on the weighed object and pushes it off the support element. This embodiment offers an especially simple design of the conveyor element. The number of segments is defined by the number of blades that extend in the radial direction outwardly from the axis.

As an especially favorable feature of the present invention, the support element is designed to hold and discharge objects of different shapes regardless of the format. Thus, according to the present invention, the support element which supports the object to be weighed is not limited to certain formats of the object and can especially be used for different and rapidly changing formats. In particular, when changing the production of tablets from one size to another, it is not necessary to use special apparatuses or to alter the design in order to be able to use the weighing station. Regardless of the format of the objects to be weighed, the support element according to the present invention makes it possible to weigh and transport the most different formats in the same manner, without providing special receiving or guiding elements. This allows an especially flexible use of the weighing station and eliminates refitting time and costs.

According to another useful embodiment of the present invention, the conveyor element is designed to rotate continuously or quasi-continuously in a first direction, with the possibility to interrupt and/or reverse the rotation in specifiable cases. As a general rule, the conveyor element continues to feed the weighed objects into a first discharge area unless a measurement result is obtained that does not meet the criteria for this discharge area. This means that the rotation of the conveyor element does not need to be periodic. Instead, the conveyor element can be driven at a largely constant rotational speed, with all of the objects initially being fed into the same discharge area. The advantage is that the conveyor element does not need to be accelerated and decelerated, which further saves time. Only in cases in which the weighing result requires that the weighed object be transported to another discharge area is it necessary to stop the conveyor element or to reverse its direction in order to separately transport this object further. Thus, according to the present invention, the weighing procedure simultaneously takes place with the rotation of the conveyor element. Suitable auxiliary feed mechanisms can be used to feed a given object to the support element in such a manner that it is weighed before a boundary component of a segmented area (for example, a blade) further transports the object. In this manner, it is ensured that the object is measured exclusively with respect to its gravity, without interfering influences by lateral or other forces, which ensures an especially high accuracy of the measurement result.

According to the present invention, a stepping motor or a magnetic drive can be used to drive the conveyor element. A simple rotary magnet is just as possible as a stepping motor, the stepping angle of which can correspond to the angle of rotation α. In principle, however, any other driving mechanism is suitable, provided that it is able to cause the conveyor element to rotate as described above.

To determine the angle of rotation α, one useful embodiment of the present invention provides for at least one sensor. This sensor can, in particular, be a contactless sensor which interacts with a boundary component of a segment of the conveyor element. Typically, this is a blade of a conveyor element which has the form of a blade-type wheel. This sensor detects the position of the blade and thus the rotary position of the conveyor element so that this position can be detected and subsequently used to control the rotary movement.

By suitably configuring at least two discharge areas of the weighing station, it is possible to create a useful configuration of a plurality of these weighing stations. These weighing stations are configured adjacent to one another so that they use a common discharge area of the same type. For example, a first weighing station might have a "go" area for holding weighed objects which meet a certain weighing criterion. According to the present invention, a neighboring weighing station should use the same "go" area to transport its own selected objects into it. On the side facing away from the "go" area, each of these weighing stations has a "no go" area into which the other objects are to be transported. According to the present invention, each of these "no go" areas are used by immediately adjacent weighing stations so that the "go" and "no go" areas are configured symmetrically with respect to one another.

These and other advantages and features of the invention will be apparent from the following description of the preferred embodiments, considered along with the accompanying drawing.

BRIEF DESCRIPTION OF THE DRAWING

The single FIGURE shows a schematic partial view of an embodiment of the weighing station according to the present invention.

DETAILED DESCRIPTION OF PREFERRED EMBODIMENTS

Referring to the FIGURE, a weighing station W comprises a load receptor L which serves to hold a weight to be weighed, with the intended load transfer direction U in the example shown being oriented vertically downwardly.

Disposed on the load receptor L is a support element E which serves as a temporary support while an object K is being weighed. The support element E has the shape of a funnel segment which is bounded along its upper edge by a substantially vertical wall. An object K to be weighed rests on the support element E in such a manner that its weight as well as the weight of the support element E are received by the load receptor L. The advantage is that the support element is completely independent of the format of the object. Special recesses and guideways on the support element are not required.

The objects K to be weighed are fed to the support element E via a feed mechanism (not shown).

Disposed on the support element E which has the shape of a funnel segment is a conveyor element F which rotates about an axis A. The conveyor element F has the form of a blade-type wheel R with three blades P. The blades P are uniformly spaced about the axis A so that each segmented area $S_1$, $S_2$ and $S_3$ which forms between the blades has approximately the same size. The axis A of the blade-type wheel R is oriented parallel to the load transfer direction U of the load receptor L such that the β between axis A and load transfer direction U is equal to zero in this particular embodiment.

The angle of aperture a formed by the blades P of the blade-type wheel R in each segment $S_1$, $S_2$ and $S_3$ corresponds approximately to the angle of aperture of the funnel element which serves as the support element E. Two blades P each of the blade-type wheel R in combination with the support element E form an upwardly open chamber which receives the object K to be weighed.

As they rotate about the axis A, the blades P of the blade-type wheel R sweep over the support surface of the support element E so that an object K located therein is laterally acted upon and moved. According to the present invention, the blade-type wheel R can rotate about the axis A both in a direction of rotation and in the opposite direction.

Disposed laterally below the support element E which has the form of a funnel segment are two discharge areas $B_g$ and $B_s$ which are separated from each other by means of a partitioning wall. The two discharge areas are designed in the form of chutes. Depending on the direction of rotation of the blade-type wheel R, an object K located in the support element E or in the respective segmented area is transported into the first discharge area $B_g$ ("go parts") or into the other discharge area $B_s$ ("no-go parts"). Thus, the objects weighed K can be optionally transported into at least these two areas simply by rotating the blade-type wheel R into one or the other direction of rotation. Using additional components that are not shown in the single FIGURE, the "go" parts can be used further and the "no-go" parts can be eliminated from the process.

According to the present invention, the blade-type wheel R with its three blades P is designed so that, on the one hand, on rotation about the angle α, the object is transported further into one or the other discharge area but that, on the other hand, a new segmented area S between two blades is immediately available to receive the next object K to be weighed. In particular, while the rotary movement is still in progress, i.e., as an object K is still being transported into one or the other discharge area $B_g$ or $B_s$, it is possible to introduce the next object K to be weighed into the next newly available support area if, based on the already swept-over angle of rotation and/or the shape of the blades P and of the support element E, it has been ascertained that the new object cannot be transported into one of the two discharge areas without first having been weighed.

This configuration makes it possible to transport and sort out weighed objects K rapidly, easily and with low mechanical complexity.

The blade-type wheel R shown in the single FIGURE and the support element E rest on the load receiver L, while the boundary means between the two discharge areas $B_g$ and $B_s$ are not borne by said load receiver. As an alternative, however, it is also conceivable for the load receiver L to support the entire configuration comprising the support element E, the conveyor element F and the discharge areas $B_g$ and $B_s$, which would greatly simplify the design of the configuration.

To detect the respective position of the blade-type wheel R and its blades P, at least one sensor M is provided, which sensor contactlessly detects the position of the blades of the blade-type wheel and transmits it in the form of signals for the purpose of controlling the rotation of the blade-type wheel. Alternatively, it is, of course, also possible to detect the rotary position of the blade-type wheel in the area of the drive mechanism or in another suitable area.

The embodiment shown in the single FIGURE makes it possible to use conveyor elements with more than three blades. The number of blades is solely dependent on the other transport conditions.

As used herein, the terms "comprising," "including," "having," and the like are to be understood to be open-ended, that is, to mean including but not limited to.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A weighing station for weighing and sorting objects to be weighed, the weighing station comprising:
  a) a load receiver for picking up a gravity force to be applied in a load transfer direction;
  b) a support element borne by the load receiver for temporarily holding and weighing at least one object;
  c) a conveyor element which, during or after the weighing step, rotates about an axis for transporting the at least one object from a weighing position on the support element;
  d) said conveyor element comprising a number of segmented areas that are disposed about the axis of the conveyor element in such a manner that during the weighing step, the at least one object to be weighed comes to lie in a respective segmented area;
  e) said conveyor element adapted to be rotated, in a conveying step, by a specifiable angle of rotation about its axis to transport the at least one object from the weighing position; and
  f) wherein the axis of the conveyor element forms an angle (β)<90° with the load transfer direction and wherein the conveyor element is further adapted to, as the at least one object is transported from the weighing position by the conveyor element, transport said object into a selected one of at least two different discharge areas adjacent to the conveyor element.

2. The weighing station of claim 1, wherein the axis of the conveyor element runs parallel to the load transfer direction.

3. The weighing station of claim 1, wherein the conveyor element is further adapted such that during the transport, a selected segmented area of the conveyor element sweeps over an area of the support element in which the at least one object to be weighed is located.

4. The weighing station of claim 3, wherein the segmented areas of the conveyor element are disposed about the axis of the conveyor element in such a manner that after one concluded conveying step, a subsequent, adjacent, segmented area is available for the further transport of a next object.

5. The weighing station of claim 1, wherein the segmented areas are uniformly spaced about the axis of the conveyor element and that the angle of rotation meets the requirement ($\alpha$)=360°/n, where the angle of rotation a corresponds to the angle that is defined by each segmented area relative to the axis of the conveyor element.

6. The weighing station of claim 1, wherein the selection of the discharge area is defined by a speed of the conveyor element.

7. The weighing station of claim 1, wherein the transport into the first discharge area can be determined by the rotation of the conveyor element about its axis in a first direction of rotation while the transport into the second discharge area can be determined by the rotation of the conveyor element in the opposite direction of rotation.

8. The weighing station of claim 1, wherein the support element substantially has the shape of a downwardly tapering funnel segment so as to allow the at least one object to be weighed to rapidly assume a position of rest.

9. The weighing station of claim 8, wherein an angle of aperture of the funnel segment substantially corresponds to the angle that defines one of the segmented areas about the axis of the conveyor element.

10. The weighing station of claim 1, wherein the conveyor element comprises a wheel having a number of boundary components which extend with respect to the axis of the conveyor element such that adjacent boundary components define a respective segmented area of the conveyor element, and wherein to transport the weighed object further, a respective boundary component laterally acts upon said object to push it off the support element as the wheel is rotating.

11. The weighing station of claim 1, wherein the conveyor element and its driving mechanism as well as the support element are borne by the load receiver of a load cell.

12. The weighing station of claim 1, wherein the support element is as adapted to be able to receive and discharge, regardless of the format, objects of different shapes.

13. The weighing station of claim 1, wherein the conveyor element is adapted for continuous or quasi-continuous rotation into a first direction, with the rotation being interruptible or reversible in specifiable cases.

14. The weighing station of claim 1, wherein the conveyor element is adapted to be driven by means of a stepping motor or a magnetic drive.

15. The weighing station of claim 1, wherein at least one sensor is provided for detecting the angle of rotation ($\alpha$).

16. The weighing station of claim 15 in which the sensor is a contactless sensor.

17. A system of weighing stations for weighing and sorting objects to be weighed, the system comprising:
   two or more weighing stations, each weighing station comprising:
   a) a load receiver for picking up a gravity force to be applied in a load transfer direction;
   b) a support element borne by the load receiver for temporarily holding and weighing at least one object;
   c) a conveyor element which, during or after the weighing step, rotates about an axis for transporting the at least one object from a weighing position on the support element;
   d) said conveyor element comprising a number of segmented areas that are disposed about the axis of the conveyor element in such a manner that during the weighing step, the at least one object to be weighed comes to lie in a respective segmented area;
   e) said conveyor element adapted to be rotated, in a conveying step, by a specifiable angle of rotation about its axis to transport the at least one object from the weighing position; and
   f) wherein the axis of the conveyor element forms an angle ($\beta$)<90° with the load transfer direction and wherein the conveyor element is further adapted to, as the at least one object is transported from the weighing position by the conveyor element, transport said object into a selected one of at least two different discharge areas adjacent to the conveyor element; and
   wherein at least one selected pair of neighboring weighing stations use a common discharge area for discharge of the same type.

* * * * *

UNITED STATES PATENT AND TRADEMARK OFFICE
CERTIFICATE OF CORRECTION

PATENT NO. : 8,330,060 B2
APPLICATION NO. : 12/097029
DATED : December 11, 2012
INVENTOR(S) : Theo Düppre It is certified that error appears in the above-identified patent and that said Letters Patent is hereby corrected as shown below:

At column 2, line 13: change "angle of rotation a" to read --angle of rotation α--.
At column 3, line 20: change "angle of rotation a" to read --angle of rotation α--.
At column 3, line 45: change "of rotation a" to read --of rotation α--.
At column 3, line 51: change "angle of rotation a" to read --angle of rotation α--.
At column 7, line 16: change "angle of aperture a" to read --angle of aperture α--.
At column 9, line 1: change "angle of rotation a" to read --angle of rotation α--.

Signed and Sealed this
Twelfth Day of February, 2013

Teresa Stanek Rea
*Acting Director of the United States Patent and Trademark Office*